United States Patent
Webb et al.

(10) Patent No.: US 9,261,919 B2
(45) Date of Patent: Feb. 16, 2016

(54) DOCK WITH COMPLIANT CONNECTOR MOUNT

(71) Applicant: Apple Inc., Cupertino, CA (US)

(72) Inventors: Michael J. Webb, Scotts Valley, CA (US); Ian P. Colahan, Cupertino, CA (US); Paul J. Thompson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/251,523

(22) Filed: Apr. 11, 2014

(65) Prior Publication Data

US 2014/0307383 A1    Oct. 16, 2014

Related U.S. Application Data

(63) Continuation of application No. 13/610,832, filed on Sep. 11, 2012, now Pat. No. 8,721,356.

(51) Int. Cl.
| | |
|---|---|
| *G06F 1/16* | (2006.01) |
| *H01R 13/631* | (2006.01) |
| *H01R 13/58* | (2006.01) |
| *H01R 33/975* | (2006.01) |

(52) U.S. Cl.
CPC ............ *G06F 1/1683* (2013.01); *G06F 1/1632* (2013.01); *H01R 13/58* (2013.01); *H01R 13/6315* (2013.01); *H01R 33/975* (2013.01)

(58) Field of Classification Search
CPC .................................................. H01R 13/6315
See application file for complete search history.

(56) References Cited

U.S. PATENT DOCUMENTS

| | | | | |
|---|---|---|---|---|
| 6,049,192 A | * | 4/2000 | Kfoury et al. | 320/113 |
| 6,193,546 B1 | * | 2/2001 | Sadler | 439/534 |
| 6,290,534 B1 | * | 9/2001 | Sadler | 439/534 |
| 6,527,572 B2 | * | 3/2003 | Jou | 439/248 |
| 6,592,387 B2 | * | 7/2003 | Komenda et al. | 439/247 |

(Continued)

FOREIGN PATENT DOCUMENTS

| | | |
|---|---|---|
| AU | 2012101888 A4 | 2/2013 |
| EP | 0 755 618 B1 | 6/2000 |

(Continued)

OTHER PUBLICATIONS

International Search Report and Written Opinion mailed on Jul. 8, 2013 for PCT Patent Application No. PCT/US2013/034484, 16 pages.

*Primary Examiner* — Ross Gushi
(74) *Attorney, Agent, or Firm* — Kilpatrick Townsend & Stockton LLP

(57) ABSTRACT

Docking stations having a connector with a compliant mount to provide improved durability and flexibility are provided herein. The compliant mount may couple a connector to a base of a docking station and may include at least a first and second flexure disposed there between. The first and second flexure may be configured to have flexural movement in along transverse direction so that, in combination, the flexural movement pivots the connector about a virtual pivot point a distance away from the flexures. The first and second flexures may be configured to project the virtual pivot point to a location on the connector where the connector protrudes from an opening in a docking housing, thereby minimizing the clearance required between the connector and docking housing, while providing controlled movement of the connector relative the dock.

22 Claims, 15 Drawing Sheets

(56) References Cited

U.S. PATENT DOCUMENTS

| | | | |
|---|---|---|---|
| 6,716,058 B2* | 4/2004 | Youn | 439/535 |
| 6,898,080 B2* | 5/2005 | Yin et al. | 361/679.41 |
| 6,926,130 B2 | 8/2005 | Skowronski | |
| 6,932,637 B2* | 8/2005 | Ewers et al. | 439/248 |
| 6,994,575 B1* | 2/2006 | Clark et al. | 439/173 |
| 7,014,486 B1* | 3/2006 | Wu et al. | 439/248 |
| 7,059,882 B2* | 6/2006 | Sugita et al. | 439/247 |
| 7,066,752 B2* | 6/2006 | Hsu et al. | 439/248 |
| 7,074,065 B1* | 7/2006 | Martinez et al. | 439/247 |
| 7,090,521 B2* | 8/2006 | Nishio et al. | 439/248 |
| 7,121,857 B1* | 10/2006 | Lewis | 439/247 |
| 7,201,594 B2* | 4/2007 | van der Mee et al. | 439/247 |
| 7,238,042 B2* | 7/2007 | Chen et al. | 439/374 |
| 7,311,541 B2* | 12/2007 | Chien et al. | 439/246 |
| 7,405,929 B1 | 7/2008 | Chuang et al. | |
| 7,426,108 B2 | 9/2008 | Carnevali | |
| 7,467,961 B2* | 12/2008 | Kuo | 439/248 |
| 7,473,141 B2* | 1/2009 | Liao | 439/638 |
| 7,488,215 B2* | 2/2009 | Mayette et al. | 439/638 |
| 7,513,801 B2* | 4/2009 | Cheng et al. | 439/638 |
| 7,538,792 B2* | 5/2009 | Takahashi | 348/207.1 |
| 7,553,192 B2* | 6/2009 | Kuo et al. | 439/640 |
| 7,580,255 B2* | 8/2009 | Crooijmans et al. | 361/679.56 |
| 7,628,628 B2* | 12/2009 | Matsuda et al. | 439/248 |
| 7,684,186 B2* | 3/2010 | Chang | 361/679.43 |
| 7,719,830 B2* | 5/2010 | Howarth et al. | 361/679.41 |
| 7,729,801 B2 | 6/2010 | Abramson | |
| 7,744,423 B2* | 6/2010 | Funahashi | 439/638 |
| 7,789,711 B2* | 9/2010 | Wu | 439/640 |
| 7,832,645 B2* | 11/2010 | Chen et al. | 235/492 |
| 7,850,484 B2* | 12/2010 | Hayashi et al. | 439/529 |
| 7,931,494 B2* | 4/2011 | Long | 439/527 |
| 7,933,117 B2* | 4/2011 | Howarth et al. | 361/679.41 |
| 8,083,195 B2* | 12/2011 | Osada | 248/274.1 |
| 8,113,873 B1* | 2/2012 | Sarraf | 439/533 |
| 8,139,353 B2* | 3/2012 | Slaby et al. | 361/679.41 |
| 8,152,561 B2* | 4/2012 | Long | 439/527 |
| 8,210,871 B2* | 7/2012 | Neu et al. | 439/569 |
| 8,223,483 B2* | 7/2012 | Hayashida et al. | 361/679.41 |
| 8,241,050 B2* | 8/2012 | Xu et al. | 439/247 |
| 8,323,040 B2* | 12/2012 | Prest | 439/131 |
| 8,355,690 B2* | 1/2013 | Krampf et al. | 455/349 |
| 8,366,468 B2* | 2/2013 | Carnevali | 439/248 |
| 8,366,469 B2* | 2/2013 | Carnevali | 439/248 |
| 8,366,480 B2* | 2/2013 | Neu et al. | 439/569 |
| 8,535,102 B1* | 9/2013 | Colahan et al. | 439/638 |
| 8,545,247 B2* | 10/2013 | Aldana et al. | 439/248 |
| 8,721,356 B2* | 5/2014 | Webb et al. | 439/248 |
| 2002/0024794 A1* | 2/2002 | Lin et al. | 361/686 |
| 2002/0032042 A1* | 3/2002 | Poplawsky et al. | 455/564 |
| 2002/0048982 A1* | 4/2002 | Gu et al. | 439/247 |
| 2003/0008566 A1* | 1/2003 | Kato et al. | 439/638 |
| 2003/0017746 A1* | 1/2003 | Lee | 439/638 |
| 2003/0148740 A1* | 8/2003 | Yau et al. | 455/90 |
| 2006/0035500 A1* | 2/2006 | Sugita et al. | 439/247 |
| 2006/0063434 A1* | 3/2006 | Bergmann et al. | 439/638 |
| 2006/0105603 A1* | 5/2006 | Nishio et al. | 439/247 |
| 2006/0141836 A1* | 6/2006 | Van Der Mee et al. | 439/247 |
| 2006/0141856 A1* | 6/2006 | Chen et al. | 439/527 |
| 2006/0172607 A1* | 8/2006 | Bangert | 439/638 |
| 2006/0250764 A1* | 11/2006 | Howarth et al. | 361/683 |
| 2006/0258224 A1* | 11/2006 | Liao | 439/638 |
| 2006/0276083 A1* | 12/2006 | Sun | 439/638 |
| 2007/0082537 A1* | 4/2007 | Chien et al. | 439/377 |
| 2007/0153463 A1* | 7/2007 | Choi | 361/683 |
| 2008/0057764 A1* | 3/2008 | Kuo | 439/248 |
| 2008/0259550 A1* | 10/2008 | Lien | 361/683 |
| 2008/0293303 A1* | 11/2008 | Liao | 439/638 |
| 2009/0009957 A1* | 1/2009 | Crooijmans et al. | 361/686 |
| 2010/0009574 A1* | 1/2010 | Shi et al. | 439/638 |
| 2010/0062615 A1* | 3/2010 | Prest | 439/38 |
| 2011/0070757 A1* | 3/2011 | Krampf et al. | 439/136 |
| 2011/0070777 A1* | 3/2011 | Krampf et al. | 439/638 |
| 2011/0095724 A1* | 4/2011 | Byrne | 320/115 |
| 2011/0098087 A1* | 4/2011 | Tseng | 455/557 |
| 2011/0117833 A1* | 5/2011 | Hong et al. | 455/3.06 |
| 2011/0134601 A1* | 6/2011 | Sa | 361/679.43 |
| 2011/0164375 A1 | 7/2011 | Hayashida et al. | |
| 2011/0250786 A1* | 10/2011 | Reid | 439/488 |
| 2011/0281451 A1* | 11/2011 | Tanis et al. | 439/248 |
| 2012/0034819 A1* | 2/2012 | Chen | 439/638 |
| 2012/0045931 A1* | 2/2012 | Carnevali | 439/544 |
| 2012/0045932 A1* | 2/2012 | Carnevali | 439/552 |
| 2012/0206875 A1* | 8/2012 | Carnevali | 361/679.41 |
| 2012/0273643 A1 | 11/2012 | Chang | |
| 2013/0002193 A1* | 1/2013 | Aldana et al. | 320/107 |
| 2013/0005179 A1* | 1/2013 | Aldana et al. | 439/529 |
| 2013/0012041 A2* | 1/2013 | Krampf et al. | 439/136 |
| 2014/0069710 A1 | 3/2014 | Webb et al. | |
| 2014/0307383 A1* | 10/2014 | Webb et al. | 361/679.44 |

FOREIGN PATENT DOCUMENTS

| | | |
|---|---|---|
| TW | M268757 U | 6/2005 |
| TW | M413308 U | 10/2011 |

* cited by examiner

Section A-A

DOCK WITH COMPLIANT CONNECTOR MOUNT

CROSS-REFERENCE TO RELATED APPLICATION

This application is a continuation application of, and claims priority to, U.S. patent application Ser. No. 13/610,832, filed Sep. 11, 2012, the contents of which are hereby incorporated by reference in its entirety.

BACKGROUND

The present invention relates to a docking station for an electronic device. More particularly, the present invention relates to a docking station having a compliant connector mount that is more durable and flexible.

Portable electronic devices (such as phones, media players, notebook/netbook computers, tablet computers) are becoming ubiquitous in today's society. Portable electronic devices commonly have display screens (e.g. a touch screen) on which users view and/or select data and functionality. For example, a user may select a video or other presentation to watch. In such circumstances, it is more convenient for the user to have the device in an upright (viewable) position by placing the device in some sort of holder so the user is not forced to hold the device during viewing.

Additionally, users would like to interface the display devices with other electronics. For example, a user may want to play music through speakers, or simply charge the device. However, during such interfacing or charging, the user would still like to be able to view the display and/or controls of the device.

To provide such features, manufacturers provide docking stations (docks) in which a user can plug the device. Often the docks will have a connector rising out from a surface, with the connector being in a position such that the device can be viewed and/or used. However, connectors can be weak points, especially when devices become large and additional stresses are placed on the connector, particularly in connectors of relatively small size. The connector may also provide most of the support of the device. Accordingly, the connectors of such docking stations can be damaged by misuse, e.g. being pulled in improper direction.

SUMMARY

Embodiments of the present invention provide docking stations having a connector with a compliant mount that is more flexible and durable. Some embodiments allow the connector to move when connected to a portable electronic device. This movement of the connector can absorb undesirable forces, thereby reducing a likelihood of the connector breaking from misuse. Examples of movement include sliding, translation, flexures, rotation and/or some combination thereof. For example, in some embodiments, if the portable electronic device is pushed forward, the connector can rotate, thereby reducing the likelihood of breakage from such a push.

In one aspect, the invention provides a mount configured to flex when the connector is stressed so as to pivot the connector at a projected or virtual pivot point a distance away from where the flexure occurs. In some embodiments, the mount is configured to provide at least two flexures or flexure hinges so that the flexural movement of the at least two flexures, in combination, pivots the connector about the virtual or projected pivot point, the pivot point being disposed a distance away from either point of flexure. The flexures of the compliant mount may also be configured to provide sufficient rigidity to the connector to support a portable device when mounted on the connector within the dock in an upright position, sufficient flexibility to allow angular displacement of a mounted portable device, and sufficient elasticity to provide a resilient biasing force to return a mounted portable device from a displaced position to the upright position. The flexures may be configured to provide controlled movement within a desired range of movement. For example, the flexures may allow a portable device mounted on the connector to tilt forward from a non-stressed mounted plane with increasing resistance to a maximum angular displacement within a range of 90 degrees or less, or in some embodiments, 45 degrees to 10 degrees. The flexures may be configured to distribute and absorb stresses associated with displacement of the connector, thereby reducing the likelihood of damage to the devices or associated connectors.

In another aspect, the compliant mount may be configured with a bias toward a particular position, such as an upright position, such that the electronic device is supported by the compliant mount (or alternatively by a rear reference surface of the docking station), thereby preventing undue strain on the rotatable connector in the non-deflected position. The bias of the compliant mount can be controlled by the shape and material properties of the compliant mount. For example, in some embodiments, the compliant mount is configured to support the connector in an upright position that is tilted back slightly, when the compliant mount is unstressed and unflexed so as to facilitate viewing or operation of the portable device by a user when mounted in the dock. The connector may be disposed partly below and partly above an outer shell of a base of the docking station, and pivot at a location on the connecter near an opening in the outer shell of the dock base through which the connector protrudes, thereby reducing movement of the connector near the opening. This aspect allows the opening in the housing to be minimized, and reduces the likelihood of interference between the connector and the docking housing as the connector pivots.

According to one embodiment, a docking station can include a base, a rear reference surface for at least partly supporting a portable electronic device in the upright position, and a movable connector that is configured to receive and electrically couple to a receptacle connector of the portable device. The movable connector can be coupled to the base by a compliant mount and biased toward the upright position. The rear reference surface can be mechanically coupled to the base and adapted to support the portable electronic device when the electronic device is coupled to the rotatable connector in its upright position. The compliant mount may include one or more flexures or flexure hinges to provide pivotal movement of the connector. In some embodiments, the compliant mount includes at least two flexure hinges so that the flexural movements, in combination, move the connector about a virtual pivot point a distance away from either point of flexure. In other embodiments, the compliant mount includes three or more flexure hinges, so that overlapping of the range of movement associate with flexure occurs at a desired pivot point location, such as near where the connector protrudes from an opening in a housing of a device, such as a docking station.

In some embodiments, the compliant mount includes at least two flexure hinges and one or both of at least two flexure hinges includes a series of undulations, such as a series of S-shaped or sinusoidal curves, to provide increased flexibility and elasticity to the compliant mount. A flexure hinge may also include a thinned plate having a plurality of opening, such as a series of elongate opening therein, so as to allow flexure of the plate, or a cantilever hinge. The at least two flexure hinges may be configured in series, in parallel or any combination so that the combined flexure movement of the at least two flexure hinges provides a desired movement of a connector attached thereto. Although various types and configures of flexure hinges are described herein, it is appreciated the flexure hinges of a compliant mount may include hinges of the same or differing types and configuration, including any combination of configurations or types of flexures.

BRIEF DESCRIPTION OF THE DRAWINGS

FIGS. 9A-1 to 9C-1 and 9A-2 to 9C-2 show perspective and side views of the compliant connector mount of FIG. 8A, respectively, during a finite element stress analysis as the compliant mount flexes from the upright position to deflected position.

DETAILED DESCRIPTION

Figure 1:
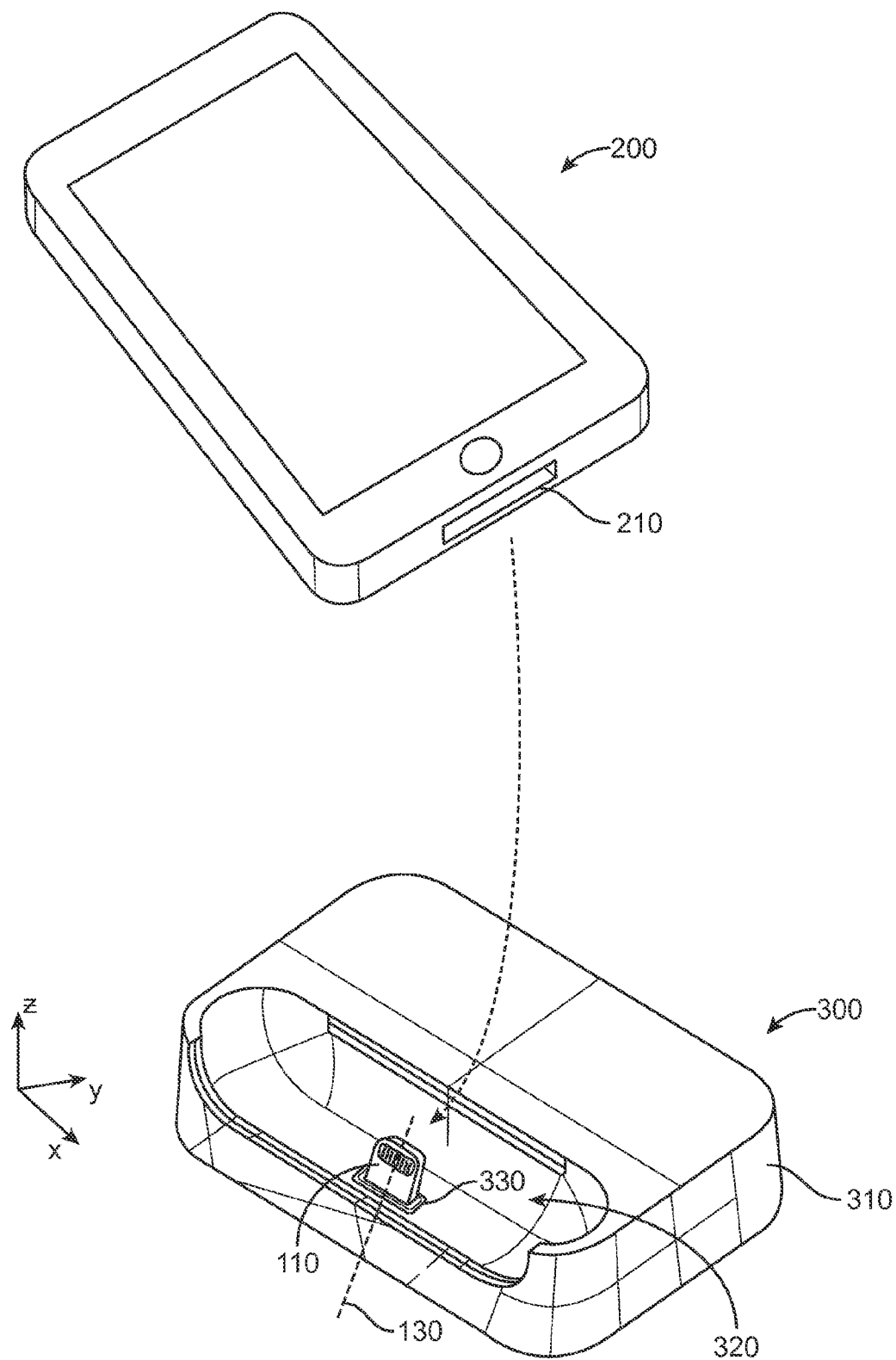
FIG. 1 is a perspective view of a docking mount and portable device according to embodiments of the present invention.

Embodiments of the present invention provide a docking station (dock) having a connector with a compliant mount that allows for improved durability, flexibility and control of movement of the connector. These objectives can be accomplished, in part, by allowing the connector to move so that the connected portable electronic device does not put a significant amount of force on the connector. For example, with limited reference surfaces (surfaces that can touch the electronic device when it is connected with the connector), a joint of a fixed connector may weaken if the portable electronic device is forced off its attachment/detachment axis. Such a force may occur inadvertently when a user reaches for the device. The force of the push and/or the force of the weight of the device, which may weaken the joint, instead simply moves the connector.

In one aspect, the connector may be configured to move or pivot relative to the dock base in order to better distribute the forces when an off axis force is applied, e.g., it moves with the force rather than completely resisting the force by not moving. In some embodiments, the connector is attached to the dock base through a compliant mount of which flexure allows the connector attached thereto to pivot about a projected or virtual pivot point from an upright position to an angularly displaced or tilted position, thereby accommodating a force applied to the connector through a portable device mounted in the docking station. The compliant mount may be configured with a bias towards a natural position in which the connector is supported upright, the bias providing a resilient force when displaced so as to inhibit forward tilt movement of the portable device beyond a maximum angular displacement and to resiliently return the connector to the upright position when the applied force is removed. The precise motion of the connector and forces from any biasing mechanism can be tuned to provide a desired motion and feel when a user moves the electronic device.

As used herein, a portable electronic device is of such size and proportion that it may be carried in the hand(s) of a person. Examples of portable electronic devices include but are not limited to media players that play or otherwise transmit audio and/or visual (video or picture) signals (e.g., iPod) and phones that allow users to communicate remotely through wireless connections. Portable electronic devices may also correspond to mini-computers, tablet computers, PDAs, internet or email based devices. In fact, portable electronic devices may be a combination of specific or dedicated devices mentioned above (e.g., a smart phone such as the iPhone™), manufactured and sold by Apple Inc. of Cupertino, Calif., the assignee of the present application.

Embodiments of the invention are discussed below with reference to figures. However, those skilled in the art will readily appreciate that the detailed description given herein with respect to these figures is for explanatory purposes as the invention extends beyond these embodiments. For example, embodiments may be used with various types of connectors between device, including non-portable devices.

FIG. 1 is a perspective view of a connector assembly in accordance with embodiments of the present invention. The connector 110 extends upwards from a base of a dock or docking station 300 and can be attached and removed from a corresponding mating connector along a mating axis 130. The corresponding mating connector may for example be a connector carried by an electronic device, such as portable electronic device 200. The connectors can slide on/off along mating axis 130 in order to couple and decouple the electrical contacts associated with the connectors. In the embodiment shown, the connector assembly 100 includes a connector 110 that protrudes upwards from within a recessed docking well 320 of a docking station 300 so as to be received within a corresponding connector receptacle 210 of a portable device such that the connector 110, at least in part, supports the portable device 200 when mounted in the upright position. As can be seen in FIG. 1, connector 110 protrudes through an opening 330 in the housing 310 of dock 300. Such a docking station can provide a platform for quickly and easily coupling a portable electronic device to another system or device as for example a computer, a power source, or peripheral devices such as a monitor, a keyboard, speakers, etc. The docking station can also hold the electronic device in a position suitable for viewing a display of the electronic device.

Docking stations may be a stand-alone unit that communicates with other devices or systems through wired (e.g., cables) or wireless (e.g., Bluetooth) connections, or alternatively, a docking station may be integrated directly into the other devices or systems. In one embodiment, connector 110 may be connected to other electronics housed within the docking station via a flexible or movably-enabled connection, such as swiping contacts, wires, traces, flexible circuits and/or the like. Some of these examples may include slack so that the connector can move between positions. The electronics may be widely varied. The electronics may for example include circuit boards, controllers, connectors, and the like. The electronics can be fixed within the body or configured to be movable to help manage the connection between the electronics and connector 110, as connector 110 moves. For example, a printed circuit board may slide along rails. Certain embodiments are described in more detail below.

Docking station 300 can also hold electronic device 200 in a position suitable for viewing a display 213 of the electronic device. Docking station 300 may include a base, which may contain various electronics, ballast, and the like. The base can serve to keep docking station 300 balanced and supported on a surface such as a table, as well as keep electronic device 200 balanced and supported when mounted thereto. Docking station 300 may also provide one or more reference surfaces for helping support the electronic device in an upright position.

Connector 110 may be coupled to other connectors, ports, jacks, transceivers, or cables of the docking station, thereby providing external connections to the other devices or systems. In the case of an integrated docking station, connector 110 may be wired directly to the components of the host device or system. In some cases, connector 110 is substantially on its own while in other cases the connector may be part of a module that includes a secondary structure, such as a housing.

In various embodiments, connector 110 can correspond to USB, Firewire, or other standardized connector formats. In one example, connector 110 is an 8-pin connector compatible with the Apple iPod® and iPhone™ devices. In an embodiment, the 8-pin connector has a thin low profile (as shown) with spaced apart side by side pins, which may be in a single row. In one embodiment, the electronic device can have a female connector receptacle connector that connects with connector 110, which may be a male connector plug. In alternative embodiments, the electronic device can have a male connector receptacle that connects with a female connector plug of a dock. In this embodiment, the female receptacle may be situated in a housing.

Figure 2:
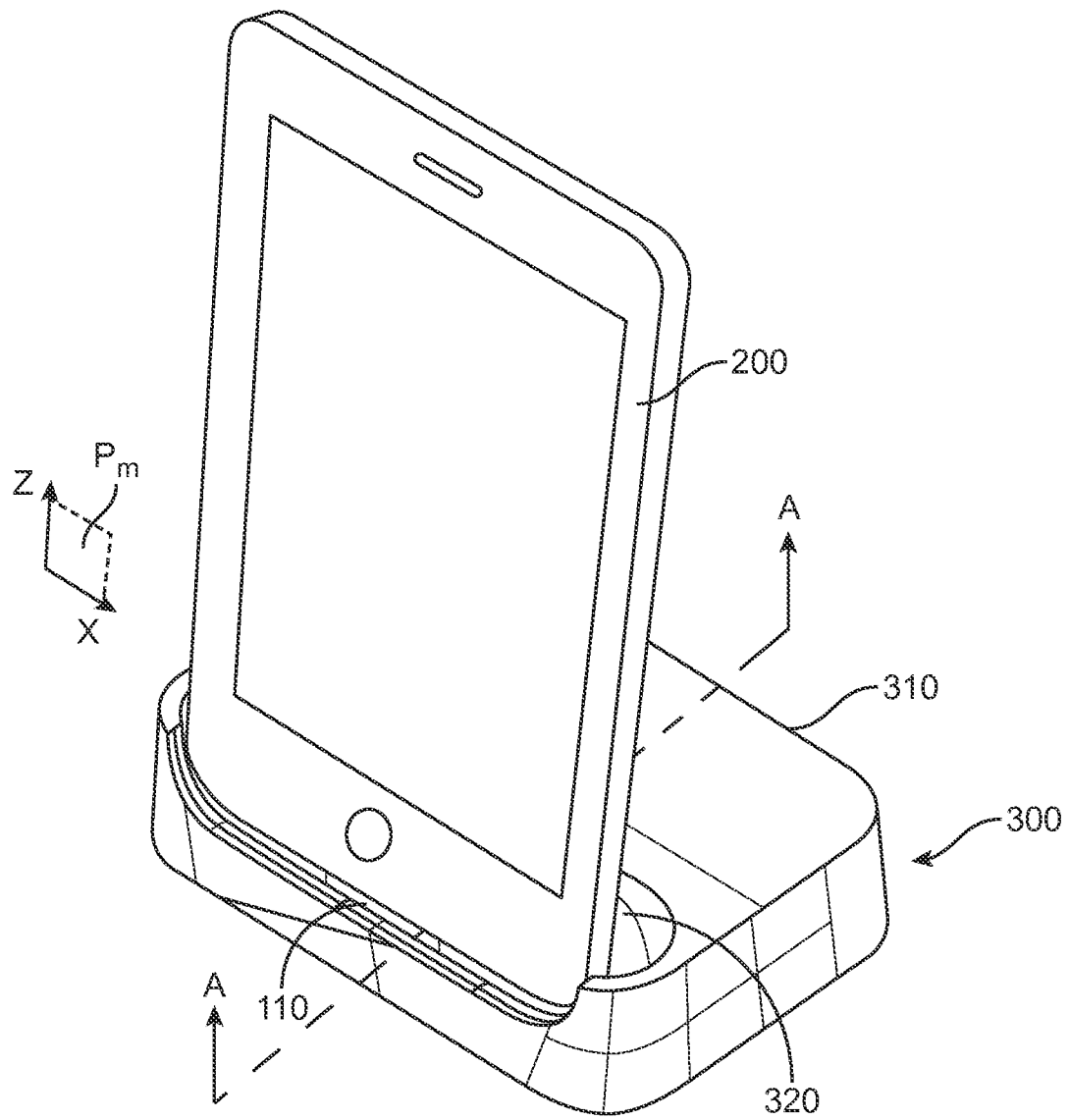
FIG. 2 shows the portable device of FIG. 1 mounted to the connector within the docking station.

In one embodiment, an insertable tab of connector 110 protrudes through an opening 330 in an outer housing 310 of the docking station 300, the insertable tab portion 114 having a plurality of electrical contacts 122 disposed thereon being exposed and substantially free from external walls and surfaces (e.g. no or limited walls that surround or are adjacent to the connector) to facilitate mating engagement within the corresponding receptacle 210 of the portable device 200. As such, connector 110 may be configured to support electronic devices coupled thereto via a corresponding mating connector with limited or no reference surfaces provided for the electronic device. While in various embodiments connector 110 protrudes from an opening 330 within a docking well 320 of a dock 300, connector 110 need not be disposed within a recess or cavity and instead may extend outward from a surface such that its sides are exposed. As shown in FIG. 2, in various embodiments, connector 110 is configured to protrude upwards in an upright position (a major component extending along the z axis) so that when a portable device 200 is mounted thereon, the portable device, as well as connector 110, extends through a mounting plane $P_m$ through which insertion axis 130 extends.

Because connector 110 can be exposed and substantially free from reference surfaces, undesirable off-axis forces may be exerted on connector 110 especially when an electronic device is connected thereon. For example, during a removal event, the electronic device may be rotated, pushed, pulled away from the mating axis thereby imparting undesirable forces on connector 110. By way of example, if mating axis 130 is in the direction of the z axis, undesirable forces may be imparted on the connector by translating the electronic device in x and y as well as rotations about x, y and z axes. In addition, there may even be some forces pulling/pushing on the connector along the z axis due to friction between the mating connectors. Certain configurations of connector 110 may lead to more susceptible areas of undesirable forces.

Figure 3A:
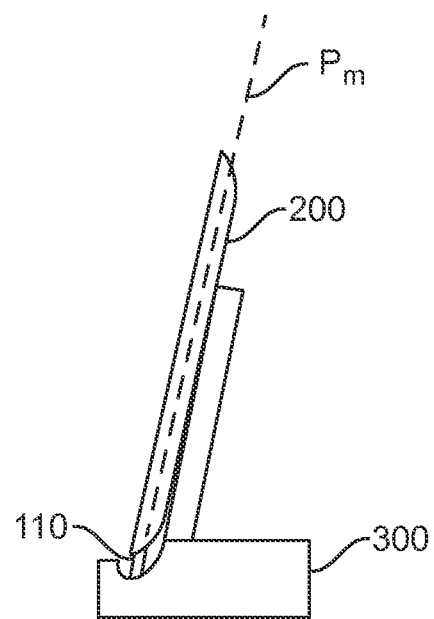
FIGS. 3A-3B show a side view of the portable device mounted in the docking station in an upright position and a side view of the portable electronic device tilted forward relative docking station.
Figure 3B:
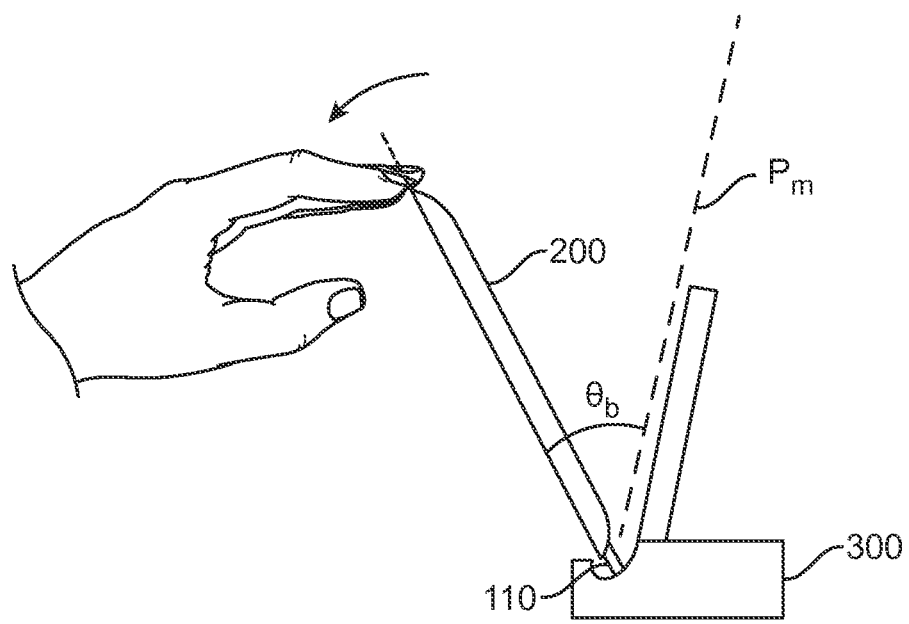

Of particular concern, are torques and bending stresses that may be applied to connector 110 through manual articulation of a portable device 200 mounted thereon, such as shown in FIGS. 3A-3B. It may be desirable to allow pivotal movement of the connector 110 relative to the dock 300 to accommodate angular displacement $\theta_b$ of the portable device from the mounting plane $P_m$, such as when a user may tilt the portable device 200 forward, as in FIG. 3B. Although various mechanisms may be used to allow for such rotational movement of the connector 100, often such mechanisms may result in excessive movement of the connector 100 so that an opening through which the connector 110 extends must be larger than desired to provide sufficient clearance for movement of the connector 110. In addition, the presence of such mechanisms may interfere with the housing of the dock or require additional clearance within the dock itself. Therefore, it would be desirable to provide a flexible, movable connector 110 that pivots substantially about a point at or near where the connector 110 protrudes through an opening so as to minimize the required clearance between the connector 110 and the housing 310 of the dock 300. This presents challenges, however, since the connector 110 is often fabricated from a substantially rigid material to withstand the stress of ordinary use and ensure integrity of the electrical connection and the connector itself, particularly in connector having relatively small dimensions. It would be further desirable to provide a controlled movement of the connector 110 within a desired range of angular displacements $\theta_b$, while reducing the overall size and complexity of the mechanisms by which such movement of the connector 110 is achieved.

Figure 4:
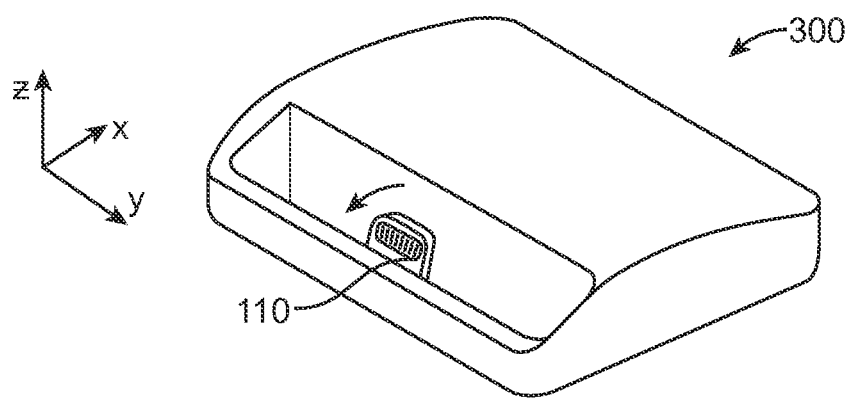
FIG. 4 shows an example docking stations having a connector with a compliant mount.

In one aspect, to achieve the above noted objectives, the connector 110 is attached to a base of the dock 300 by a compliant mount 100 that allows for movement of the connector 110 at a virtual pivot point relative to the base at or near where the connector 110 protrudes from a housing of the dock 300 by providing flexural movement a distance below the virtual pivot point. By projecting the pivot point a distance away from the flexure that provide for the pivotal movement, the compliant mount 100 can avoid interference with the housing of the dock. The compliant mount 100 may also be configured to allow for movement of the connector 100 about a pivotal axis substantially parallel to the x-axis, such as shown by the arrow in FIG. 4.

Figure 5A:
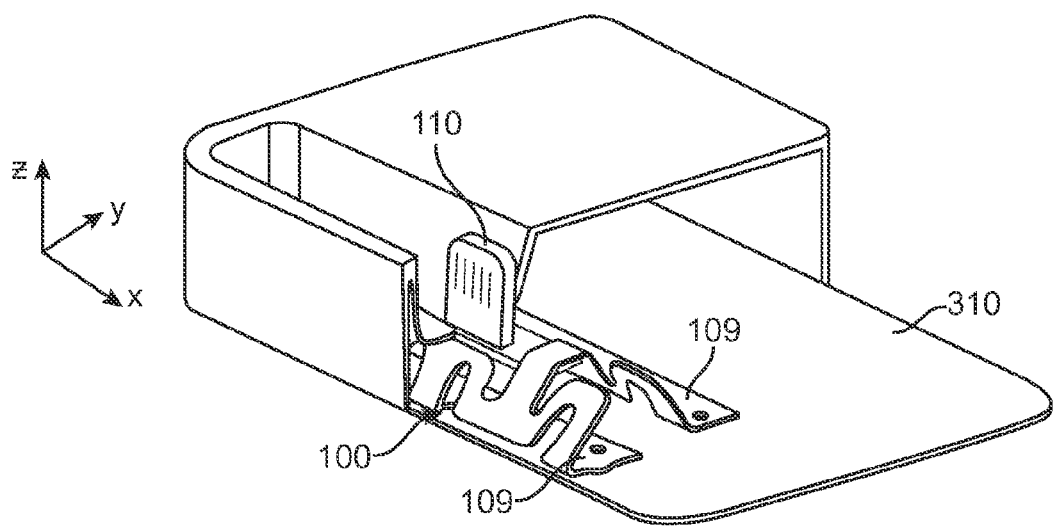
FIG. 5A-5C show various views an example docking station with a compliant connector mount having a series of undulations or convolutions.
Figure 5B:
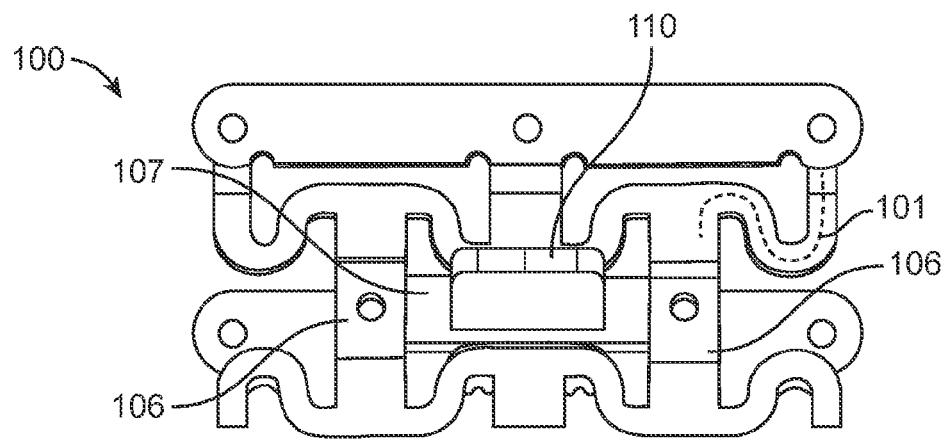
Figure 5C:
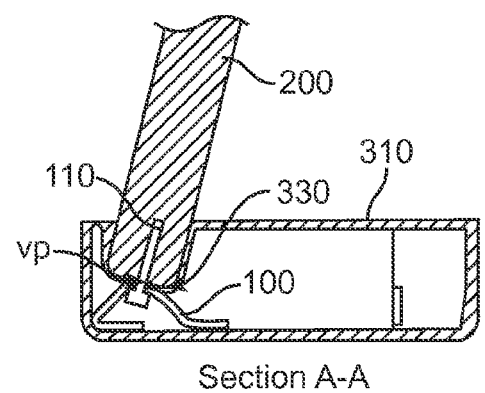

FIGS. 5A-5C illustrate an example of one such compliant mount 100, the compliant mount including a first and second flexure hinge, each flexure hinge comprising a series of S-shaped undulation or convolutions (as shown in FIG. 5B). The series of S-shaped curves providing sufficient flexure to accommodate a range of movement of the connector 110 without elastically deforming so as to provide a resilient force to bias the connector 110 towards an upright position, as shown in FIG. 5A. Providing two hinges having flexural movement in different directions allows the connector 110 to pivot about a virtual pivot point vp projected a distance away from the points of flexure on the flexure hinges. The location of the pivot point vp, may be a substantially fixed location relative to the dock 300 or may be a range of location within close proximity. Alternatively, the location of the virtual pivot point vp may be disposed along a line or curve defined by the overlapping ranges of motion of the one or more flexure hinges of the compliant mount.

In the embodiment of FIGS. 5A-C and 6A-6B, the compliant mount 100 comprises a first flexure hinge 102 and a second flexure hinge 104, each having a major dimension extending along the x-axis so as to distribute and better withstand any torsional forces applied through the connector 110. The first and second flexure hinge 102, 104 are connected to each other by two beams 106 extending along the y-axis which in turn are coupled with the connector 110 through connector plate 107 extending between the pair of beams 106. The connector 110 may be rigidly coupled with the connector plate 107, such as by a weld, or may be integrally formed with the plate 107. In the present embodiment, each of the S-shaped curves extends between a mounting plate 109 rigidly attached to the bottom inside surface of the dock housing 310 and one of the pair of beams 106 connecting the first and second flexure hinges 102, 104. Although in the present embodiment, each flexure hinge includes four S-shaped undulations, it is appreciated other embodiments may include flexure hinges of different numbers of undulations, such as one to ten undulations, or various other shapes having flexural properties, such as chevrons, coils, and diamonds.

Figure 6A:
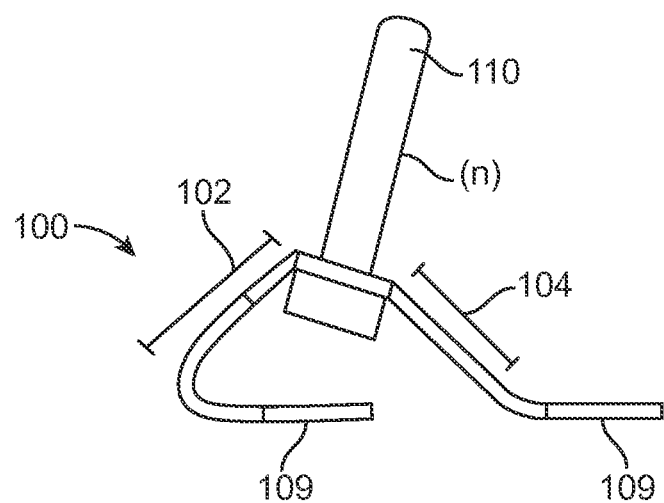
FIGS. 6A-6B show side and perspective views of a connector supported in an upright position within the compliant mount of FIG. 5A.
Figure 6B:
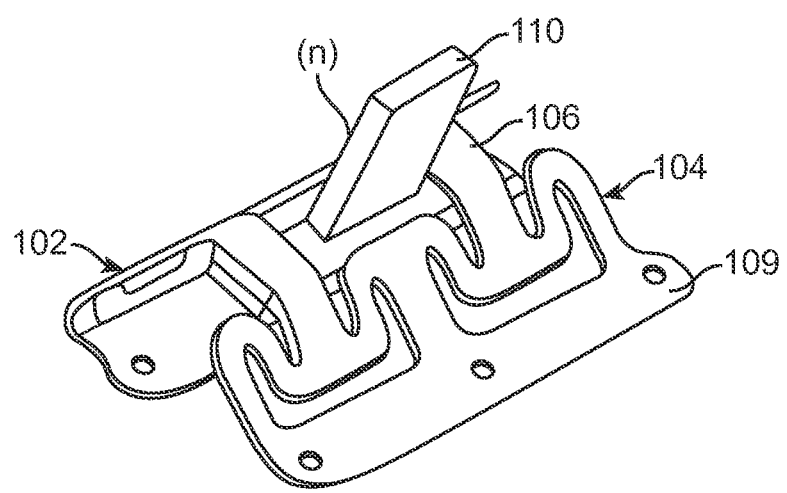

FIGS. 6A-6B illustrate the compliant mount with connector in a "natural" (n) position towards which the compliant mount 100 is naturally biased. In this position, the first and second flexure hinges 102, 104 are non-displaced and under minimal stresses, such as those associated with supporting the connector 110.

Figure 7A:
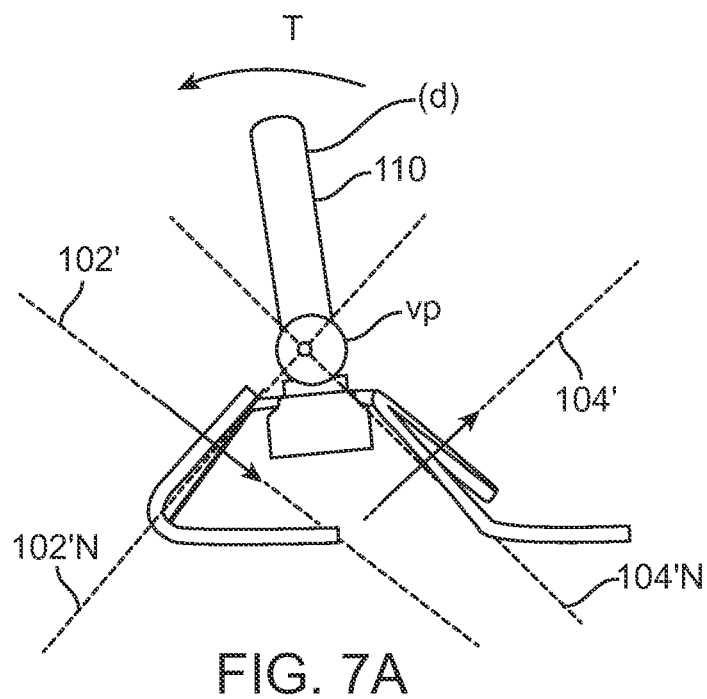
FIGS. 7A-7B show side and perspective views of a connector having been tilted forward by an applied force, the compliant mount flexed forward into a deflected position.
Figure 7B:
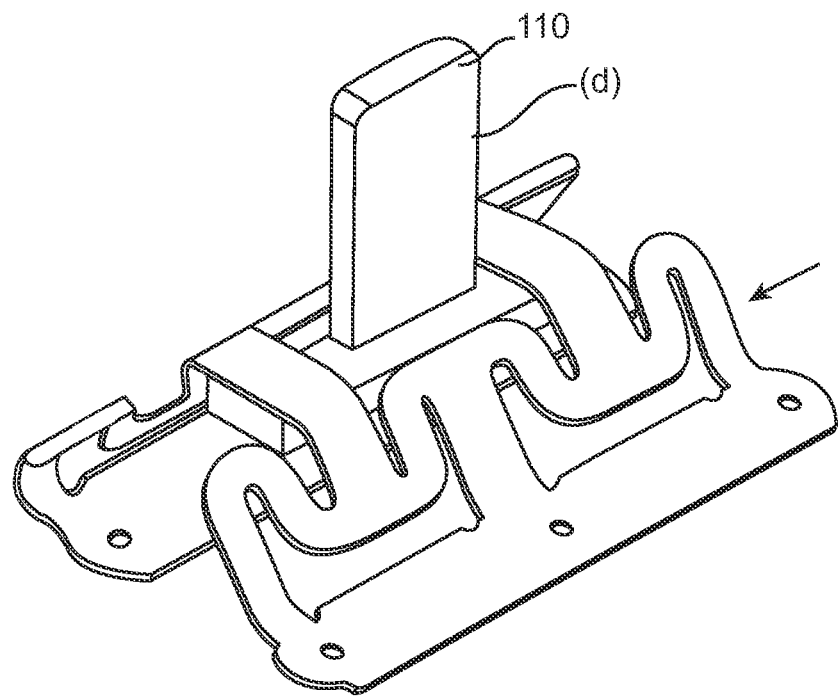

FIGS. 7A-7B illustrate the example compliant mount 100 with connector 110 in a "deflected" (d) position in which the connector 110 has been tilted forward towards the first flexure hinge 102. In this position, the first and second flexure hinges 102, 104 are under stress and are flexed along their respective flexural axes 102' and 104' respectively. As can be understood with reference to the arrows in FIG. 7A, movement of the first flexure hinge in combination with movement of the second flexure along their respective axes results in a pivotal or rotational type movement of connector 110 about a virtual pivot point vp. In some embodiments, this point can be determined by an intersection of the normal axes $102'_N$ and $104'_N$ of the flexural movement. Although in some embodiments, the virtual pivot point is substantially fixed relative to the dock, in other embodiments, the virtual pivot point may move along with the flexural axes along which flexural movement occurs. Thus, the location at which the virtual pivot point occurs can be precisely controlled by adjusting the flexural properties of the flexure hinges as well as by their configured location and orientation. In the embodiment shown, the first and second flexure hinges are configured so that the virtual pivot point occurs near a first section of the connector 110 which protrudes through the opening of the dock housing 310. By configuring the compliant mount 100 to provide a virtual pivot point at this location, such as shown in FIG. 5C, movement of the connector 110 at this location is minimized, which requires less clearance between the connector 110 and the dock housing 310, thereby allowing the size of the opening through which the connector protrudes to be reduced. This aspect can be understood further with reference to FIGS. 8C-8D, which shows clearance gaps (g,g') between the front and rear surfaces of the connector 110 and the rigid housing 310 at the opening 133 through the connector 110 protrudes.

Coupling the base of the connector 110 to a connector plate 107 having a width greater than a width of the connector 110 allows the compliant mount to distribute forces applied through the connector 110 over a greater distance so as to provide improved resistance to rotational forces about each of the x, y and z-axes. In addition, distributing the forces over a first and second flexure hinge having a width along the x-axes greater than that of the connector 110 assists in reducing the stresses to allow the flexure of the hinges to remain below plastic deformation so that the flexure hinges can accommodate flexural movement while still maintain sufficient elasticity to provide a resilient bias towards the upright position.

Figure 8A:
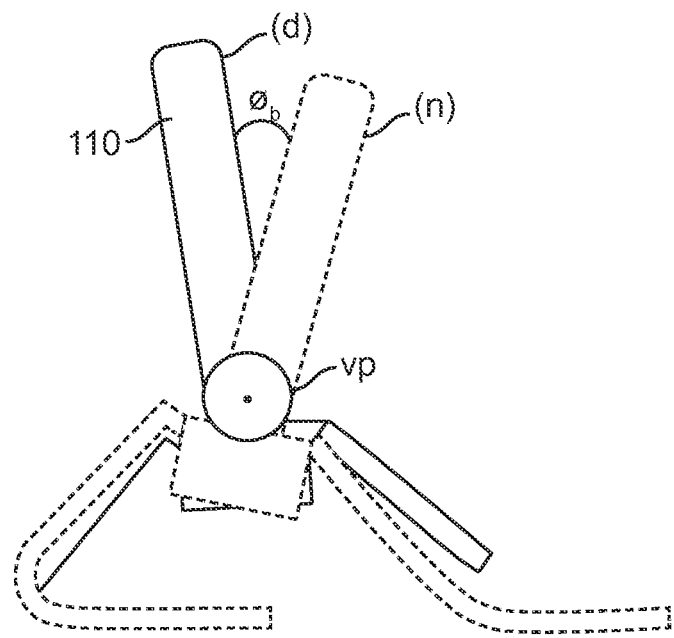
FIG. 8A show a superimposed side view of a connector within the compliant mount in the natural/non-deflected upright position and the forward-tilt/deflected position.
Figure 8B:
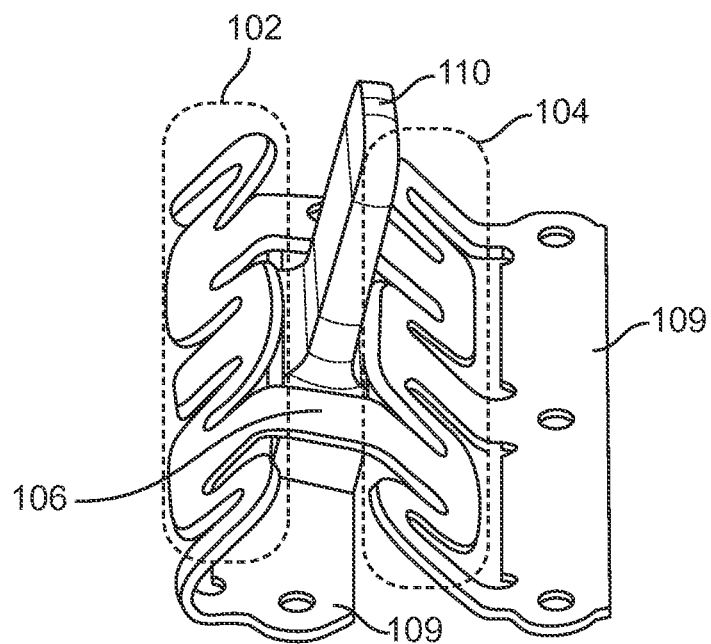
FIG. 8B shows a perspective view of the connector and compliant mount of FIG. 8A.
Figure 8C:
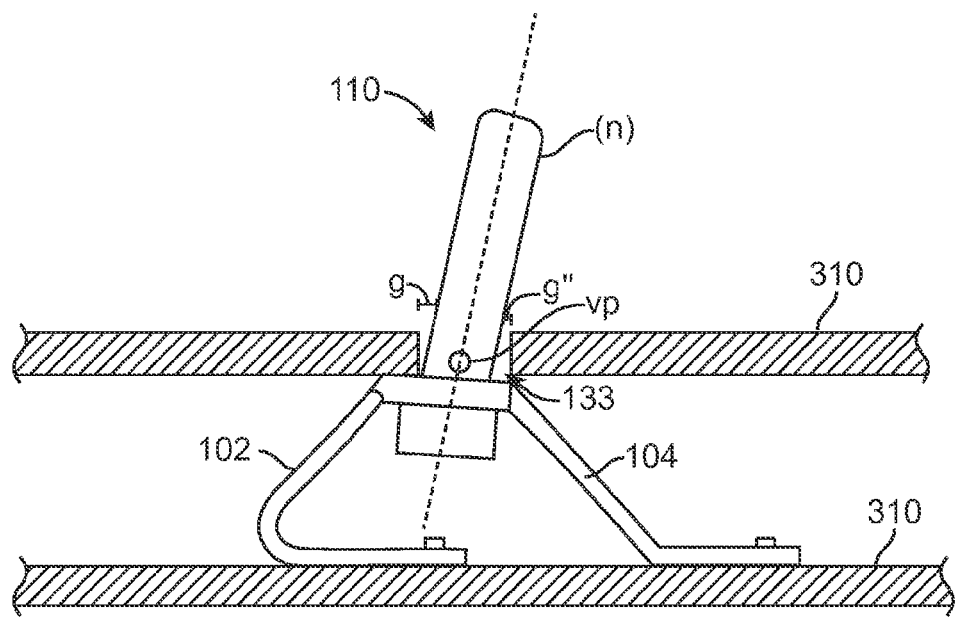
FIGS. 8C-8D show cut-away side views of the connector on the compliant mount of FIG. 8A within a docking station housing in each of the upright position and deflected position, respectively.
Figure 8D:
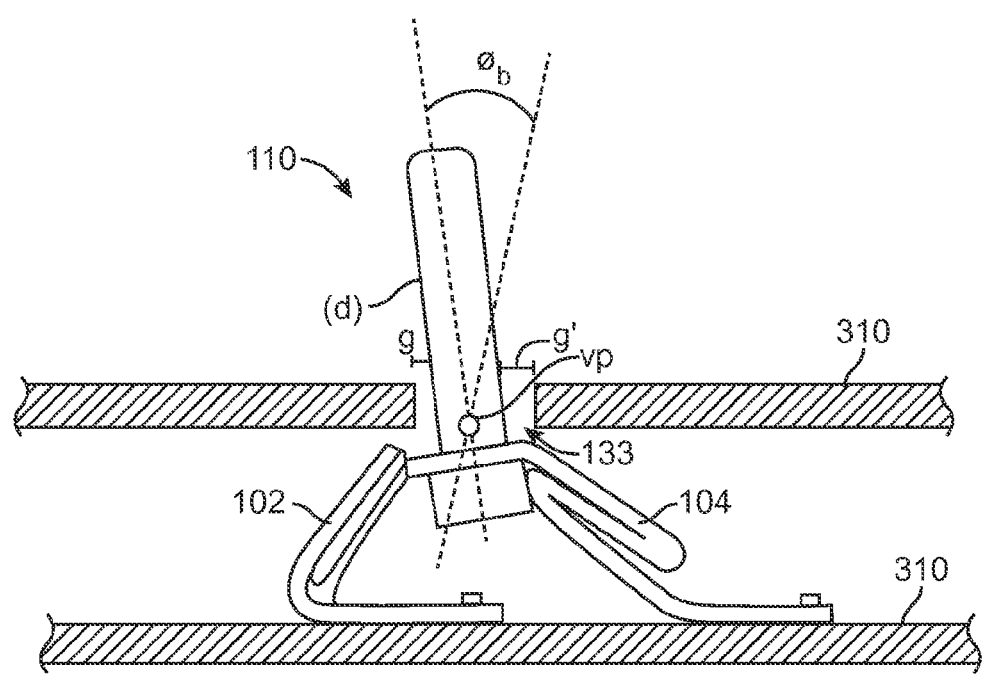
Figures 1, 9A:
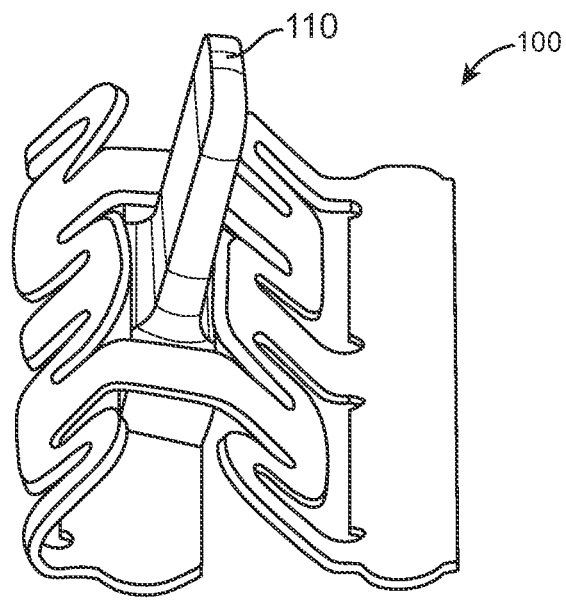
Figures 2, 9A:
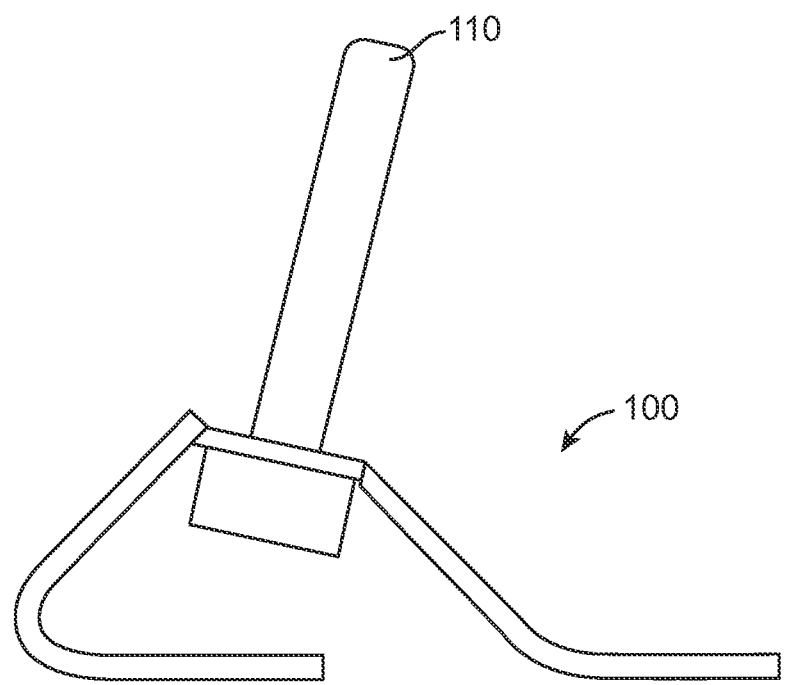
Figures 1, 9B:
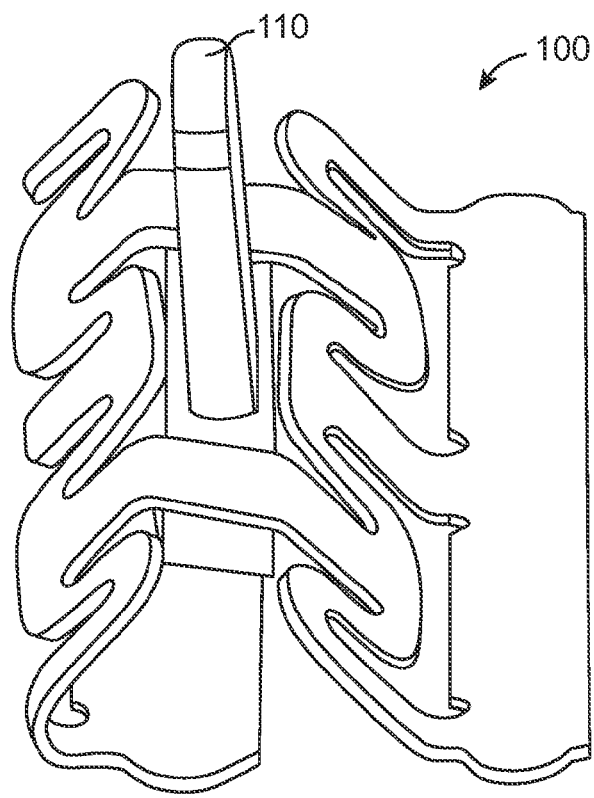
Figures 2, 9B:
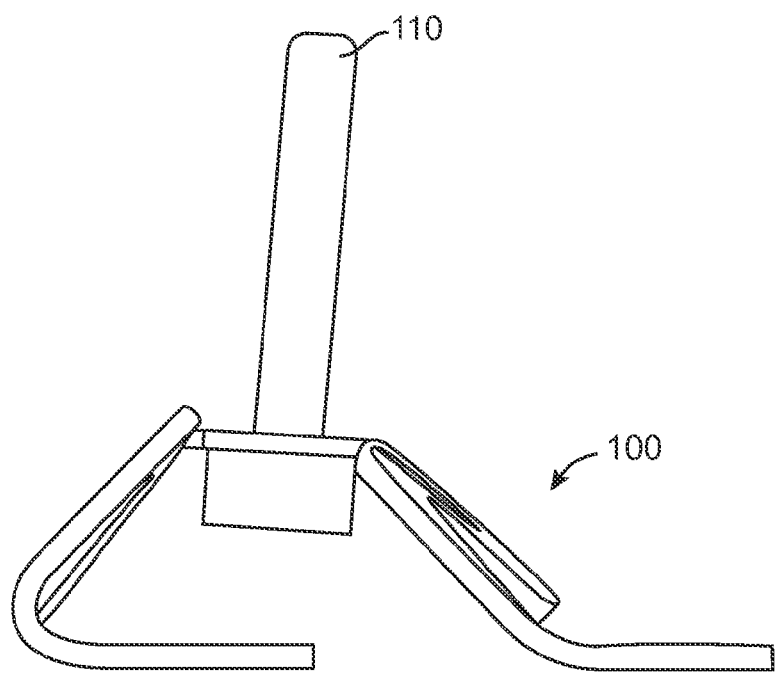
Figures 1, 9C:
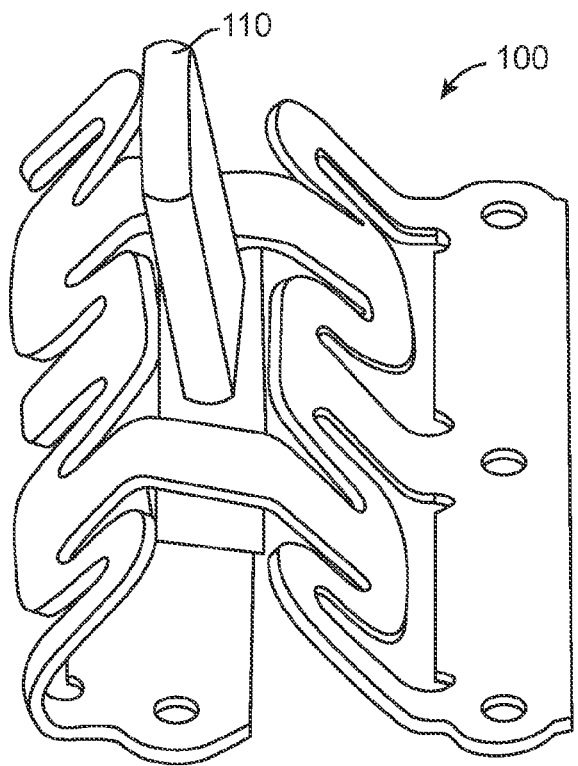
Figures 2, 9C:
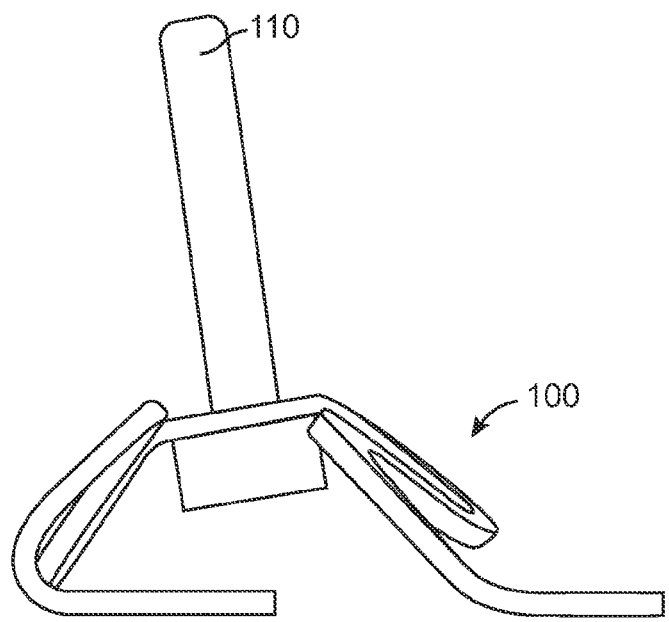
Figure 10:
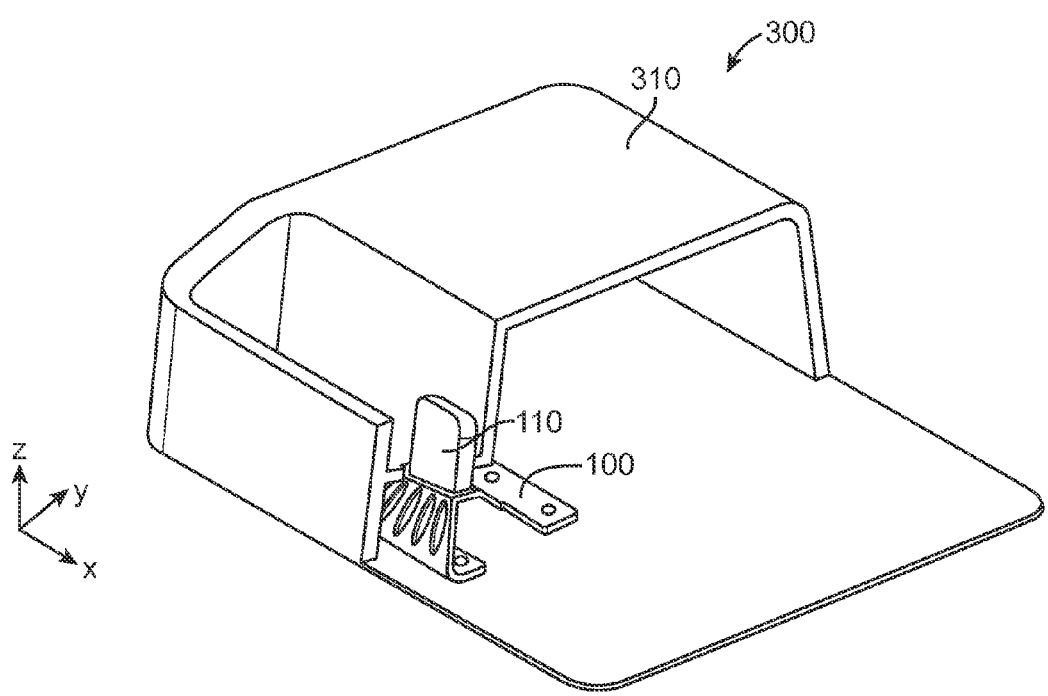
FIG. 10 shows a cut-away view of alternative example of a connector and compliant mount within a docking station.
Figure 11A:
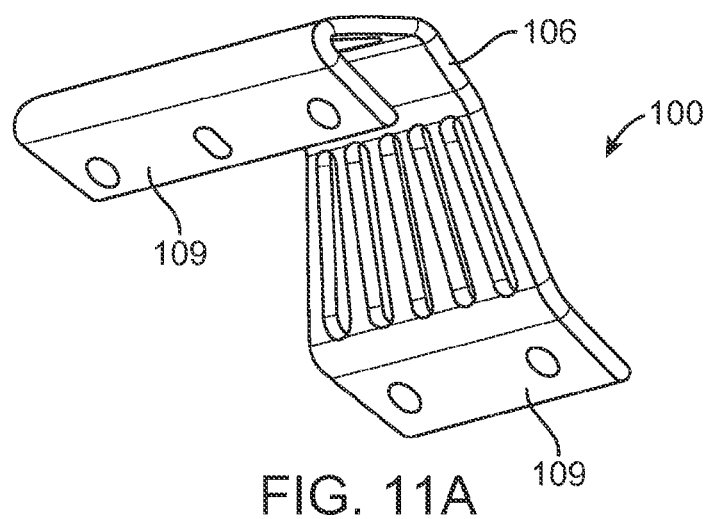
FIGS. 11A-11C show various perspective views of the compliant mount of FIG. 10.
Figure 11B:
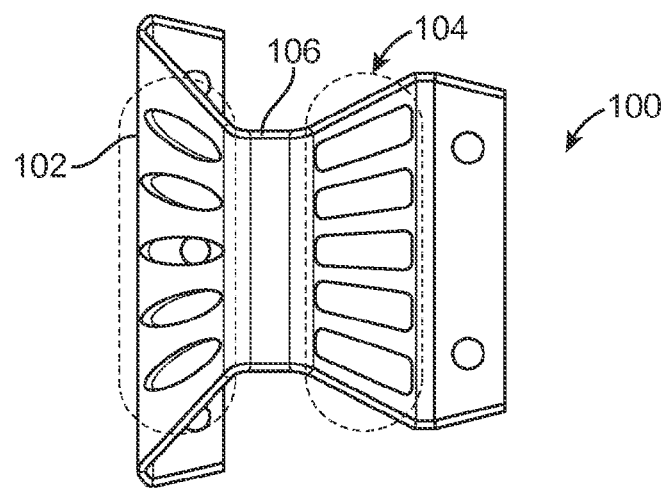
Figure 11C:
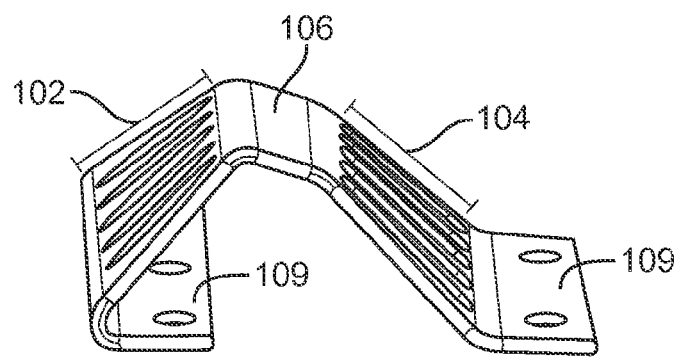

FIG. 8A shows a superimposed side view of the compliant mount 100 and connector 110 of FIG. 5A in the natural (n), non-deflected position and the deflected position (d). In some embodiments, as the angular displacement $\theta_b$ of the connector 110 increased, the resilient force provided by the first and second flexure hinges also increases thereby inhibiting displacement of the connector 110 beyond a maximum range, so as to prevent damage to either the devices or associated connectors. The resilient force is determined largely by the configuration (e.g. position, dimensions, and orientation) and material properties of the flexural hinges, which may be selected to provide a desired range of allowable angular displacement or biasing force. In some embodiments, the first and second flexure hinges are configured to provide a maximum angular displacement within a range of about 10 degrees to 45 degrees from the mounted plane $P_m$ through which the connector 110 extends when in the natural, non-deflected position.

FIGS. 9A-1 to 9C-1 and 9A-2 to 9C-2 show perspective and side views of the connector and compliant mount of FIG. 8A, respectively, during a finite element stress analysis as the compliant mount flexes from the upright position to deflected position. The more flexure experienced within the first and second flexure hinges, the stress is visible within the flexural hinges 102, 104. In addition, the greater the flexure displacement, the greater the resilient force biasing the hinges back towards the natural position assuming that displacement remains below plastic deformation.

FIGS. 10 and 11A-11C shows a cut-away view of alternative example of a connector and compliant mount within a docking station. Similar to the embodiment in FIG. 5A, the compliant mount 100 includes an A-frame type configuration with an inclined first flexure hinge 102 and a declined second flexure hinge 104 connected by beam 106 to which a base of the connector 110 is attached such that the combined movement of the first and second flexure hinge project a pivot point upwards a distance away from the hinges to a virtual pivot point disposed at or near where the connector protrudes through an opening in the dock housing 310. The series of openings within the thin plate of each of the first and second flexure hinges reduces the stiffness to allow sufficient flexure of the hinge to accommodate a range angular displacement of the connector 110, yet provide sufficient rigidity to inhibit flexure beyond a maximum range of angular displacement, and sufficient elasticity to provide a resilient biasing force toward the natural, upright position shown in FIGS. 10 and 11C.

Figure 12A:
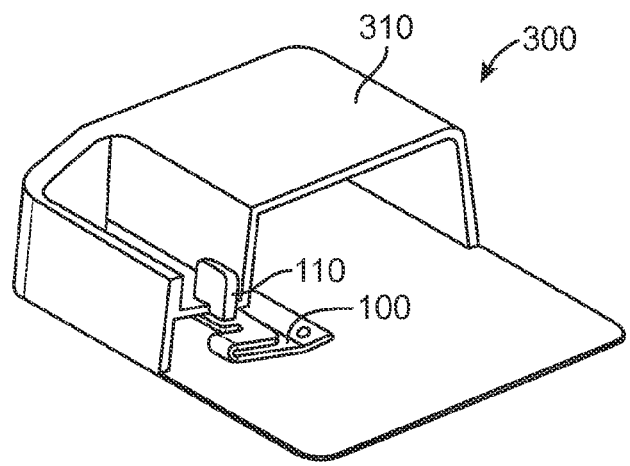
FIGS. 12A-12C show a cut-away view of another example connector with compliant mount in a docking assembly and a detail perspective and side view of the connector and compliant mount, respectively.
Figure 12B:
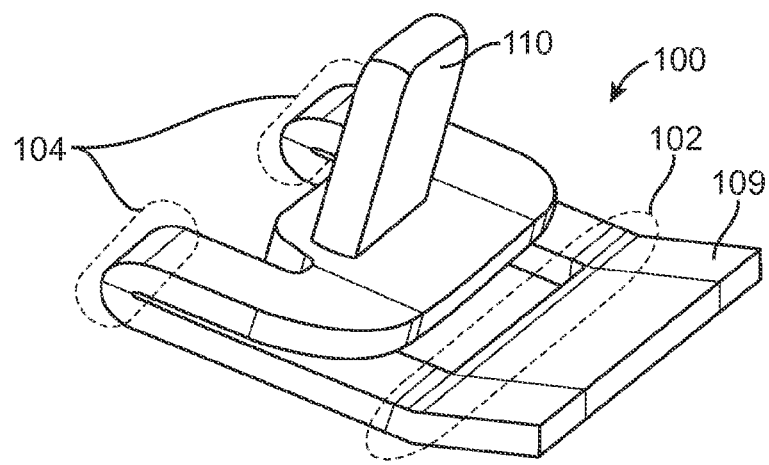
Figure 12C:
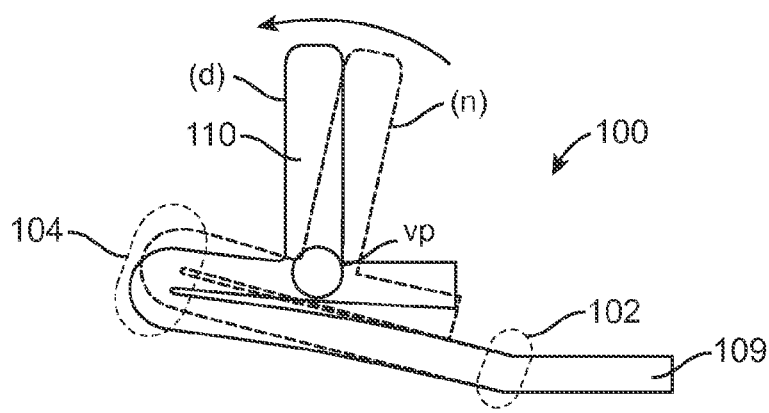

FIGS. 12A-12C show a cut-away view of another example connector with a compliant mount having a first and second flexure hinge. In this embodiment, each flexure hinge comprises a reverse cantilever design, the first and second hinges being arranged in series between the connector 110 and the mounting plate 109 attached to the dock housing 310. Similar to the embodiment described above, the first and second hinges are configured so that, in combination, flexure movement of the first and second flexure hinges provides movement of the connector about a virtual pivot point projected a distance away from either hinges, such as at a location on the connector 110 at or near where the connector protrudes through the opening in the dock housing. In this embodiment, as the connector 110 pivots forwards, the first flexure hinge (the lower cantilever) pivots downward while the second flexure hinge pivots upwards.

It is appreciated that although in various embodiments the compliant mount is described as including at least a first and second flexure or flexure hinge, the complaint mount is not so limited and may include additional flexure hinges or varying combinations of flexure hinges, as desired, to provide additional flexibility or improved control over the movement of the connector relative to the dock. The specific details of particular embodiments may be combined in any suitable manner or varied from those shown and described herein without departing from the spirit and scope of embodiments of the invention. Moreover, the invention may also provide other features of docking stations, such as speakers, a video screen computers, and charging mechanisms.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A docking station for a portable electronic device, the docking station comprising:
   a base;
   a connector movably coupled with the base; and
   a compliant mount coupling the connector to the base, the compliant mount being configured to support the connector in a mounting position for mounting of the portable electronic device on the connector,
   wherein the compliant mount is configured with one or more flexures between the base and connector such that a combination of movements, including flexural movement of the one or more flexures, moves the connector about a pivot point projected a distance away from a point of flexure of the one or more flexures,
   wherein the one or more flexures comprise a first and second flexure, wherein the first flexure flexes along a first flexure axis and the second flexure flexes along a second flexure axis, the first and second flexure axes being transverse to one another such that a normal axis of the first flexure axis intersects a normal axis of the second flexure axis at or near the projected pivot point.

2. The docking station of claim 1, wherein the combination of movements include any of a sliding, translation, flexure, and rotational movement.

3. The docking station of claim 1, wherein the one or more flexures comprise a first flexure and a second flexure extending parallel to and spaced apart from each other.

4. The docking station of claim 1, wherein the compliant mount is configured so that the projected pivot point is located at or near where the connector couples to the compliant mount.

5. The docking station of claim 1, wherein the base includes an outer shell having an opening through which the connector protrudes, and wherein the compliant mount is configured so that the projected pivot point is located on the connector at or near where the connector protrudes through the opening.

6. The docking station of claim 1, wherein the one or more flexures comprises a first flexure and a second flexure, wherein the connector is coupled to the compliant mount between the first and second flexures.

7. The docking station of claim 1, wherein the one or more flexures comprises a first flexure and a second flexure, wherein the first and second flexures are disposed between where the compliant mount couples to the base and where the compliant mount couples to the connector.

8. The docking station of claim 1, wherein the projected pivot point is within a range of locations near where the connector attaches to the compliant mount and moves within the range of locations during displacing movement of the connector provided by the compliant mount.

9. The docking station of claim 1, wherein the one or more flexures are defined within one integral piece.

10. The docking station of claim 1, wherein the compliant mount is configured to support the connector in the mounting position when in a non-displaced state such that the one or more flexures provide a biasing force towards the mounting position that increases with flexural displacement of the one or more flexures.

11. The docking station of claim 10, wherein the connector is configured to receive and electrically couple to a receptacle connector of the portable electronic device, the station further comprising electronic circuitry electronically coupled with a plurality of contacts of the connector, wherein the compliant mount further includes a flexible circuit that electrically couples the moveable connector with the electronic circuitry.

12. The docking station of claim 10, wherein the one or more flexures are configured with sufficient flexibility to allow a desired angular displacement of the connector from the mounting position when a displacing force is applied to the connector.

13. A docking station for a portable electronic device, the docking station comprising:
   a base;
   a connector movably coupled with the base; and
   a compliant mount coupling the connector to the base, the compliant mount being configured to support the connector in a mounting position for mounting of the portable electronic device on the connector,
   wherein the compliant mount is configured with one or more flexures between the base and connector such that a combination of movements, including flexural movement of the one or more flexures, moves the connector about a pivot point projected a distance away from a point of flexure of the one or more flexures,
   wherein at least one flexure of the one or more flexures comprises undulating segments that undulate along an axis substantially parallel to a pivotal axis of the projected pivot point.

14. The docking station of claim 13, wherein the undulating segments comprise a series of S-shaped or sinusoidal curves.

15. The docking station of claim 13, wherein the one or more flexures are defined within one integral piece.

16. A docking station for a portable electronic device, the docking station comprising:
a base;
a connector movably coupled with the base; and
a compliant mount coupling the connector to the base, the compliant mount being configured to support the connector in a mounting position for mounting of the portable electronic device on the connector,
wherein the compliant mount is configured with one or more flexures between the base and connector such that a combination of movements, including flexural movement of the one or more flexures, moves the connector about a pivot point projected a distance away from a point of flexure of the one or more flexures,
wherein the one or more flexures comprise multiple cantilevers connected in series.

17. The docking station of claim 16, wherein the one or more flexures are defined within one integral piece.

18. A docking station for a portable electronic device, the docking station comprising:
a base;
a connector movably coupled with the base; and
a compliant mount coupling the connector to the base, the compliant mount being configured to support the connector in a mounting position for mounting of the portable electronic device on the connector,
wherein the compliant mount is configured with one or more flexures between the base and connector such that a combination of movements, including flexural movement of the one or more flexures, moves the connector about a pivot point projected a distance away from a point of flexure of the one or more flexures,
wherein at least one flexure of the one or more flexures comprises a series of beams extending between where the compliant mount is coupled to the connector and where the compliant mount is coupled with the base.

19. The docking station of claim 18, wherein the one or more flexures are defined within one integral piece.

20. A docking station for a portable electronic device, the docking station comprising:
a base;
a connector movably coupled with the base; and
a compliant mount coupling the connector to the base, the compliant mount being configured to support the connector in a mounting position for mounting of the portable electronic device on the connector,
wherein the compliant mount is configured with one or more flexures between the base and connector such that a combination of movements, including flexural movement of the one or more flexures, moves the connector about a pivot point projected a distance away from a point of flexure of the one or more flexures,
wherein the one or more flexures are configured with sufficient stiffness to inhibit angular displacement of the connector beyond a maximum angle within a range of about 10 to 45 degrees.

21. The docking station of claim 20, wherein the one or more flexures are configured with sufficient elasticity so as to resiliently return the connector to the mounting position when a displacing force applied to the connector is removed.

22. A docking station for a portable electronic device, the docking station comprising:
a base;
a connector movably coupled with the base; and
a compliant mount coupling the connector to the base, the compliant mount being configured to support the connector in a mounting position for mounting of the portable electronic device on the connector,
wherein the compliant mount is configured with one or more flexures between the base and connector such that a combination of movements, including flexural movement of the one or more flexures, moves the connector about a pivot point projected a distance away from a point of flexure of the one or more flexures, wherein the projected pivot point is at a substantially fixed location relative to the base.

* * * * *